US008635095B2

(12) United States Patent
Lee

(10) Patent No.: US 8,635,095 B2
(45) Date of Patent: Jan. 21, 2014

(54) METHOD AND APPARATUS FOR TRACKING AN INTENT

(75) Inventor: Shari H. Lee, Hayward, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1637 days.

(21) Appl. No.: 11/224,498

(22) Filed: Sep. 12, 2005

(65) Prior Publication Data

US 2007/0061175 A1 Mar. 15, 2007

(51) Int. Cl.
G06Q 10/00 (2012.01)

(52) U.S. Cl.
USPC .......................................... 705/7.11

(58) Field of Classification Search
USPC .......................................... 705/7.11
See application file for complete search history.

(56) References Cited

U.S. PATENT DOCUMENTS

| 4,232,199 | A | 11/1980 | Boatwright et al. |
| 4,782,517 | A | 11/1988 | Bernardis et al. |
| 4,782,519 | A | 11/1988 | Patel et al. |
| 5,012,511 | A | 4/1991 | Hanle et al. |
| 5,086,461 | A | 2/1992 | Thorn et al. |
| 5,222,125 | A | 6/1993 | Creswell et al. |
| 5,416,833 | A | 5/1995 | Harper et al. |
| 5,491,742 | A | 2/1996 | Harper et al. |
| 6,937,993 | B1 * | 8/2005 | Gabbita et al. ............... 705/7.22 |
| 6,941,514 | B2 * | 9/2005 | Bradford ....................... 715/700 |
| 2002/0111842 | A1 * | 8/2002 | Miles ............................... 705/8 |
| 2002/0123919 | A1 * | 9/2002 | Brockman et al. ................ 705/7 |
| 2004/0236620 | A1 * | 11/2004 | Chauhan et al. ................. 705/9 |
| 2005/0010572 | A1 * | 1/2005 | Clark et al. ..................... 707/10 |
| 2005/0197852 | A1 * | 9/2005 | Gebhard et al. ................. 705/1 |

* cited by examiner

Primary Examiner — Mark A Fleischer
(74) Attorney, Agent, or Firm — Jackson Walker L.L.P.

(57) ABSTRACT

A method for tracking an intent comprises, for an intent parameter, searching a Structure Access Intent Tracker database for at least one record pertaining to the intent parameter, each record identifying an intent. The method also comprises, in response to the searching, a provision of a report that includes a numerical count of the plurality of records.

20 Claims, 6 Drawing Sheets

FIG. 2

| INTENT TRACKER - ENGINEER | E.A. INPUT SCREEN | ADDRESS INFORMATION |

SAIT - Structure Access Intent Tracker

INTENT #: PT03S0021Q3    JOB #: Q34231R    APPL #: OAK-719+P-REB    DATE: 11/1/2002

CLEC: COMCAST    GEO/CO: Q365    ENGINEER: MANALO    POLES ON JOB: 137

POLES ON INTENT: 40    INTENT TYPE: PDG 100% ANC    PM #'S: ____    PGE SENT DATE: 2/26/2004

START DATE: 7/10/2003    END DATE: 7/23/2003

PGE REVISION 1 ____ SBC CORRECTED ____    60 DAYS OUT: ____
PGE REVISION 2 ____ SBC CORRECTED ____    PGE RECEIVED DATE: ____
                                            CHG'D SLIMS STATUS: ____

NOTES:
Check #249010690 remitted for PG&E from Comcast 6/10/03.
Pending Intent completion.

1/27/05- PG&E RESPONDS TO INTENT. RESPONSE BEING
PROCESSED BY TS. TS.

TOTAL INTENTS: ____    INTENT 3: ____
INTENT 2: ____    INTENT 4: ____
OWNER-TO-OWNER: ____    INTENT TO CORE: ____

SPOC INITIATED: ____    CAN BE 18/1 DB: ____    SAVE/PREVIOUS    SAVE/NEXT    SEARCH    PRINT

COURTESY FINAL/FORM 48: ____    FORM 48: ____    INTENT FINAL BILLED: ____    NCIPA CLOSED: ____    INTENT CANCELLED: ____

RECORD << < 21 > >| >|} OF 1543

Open
About
Suspend
No Dialog
Exit

FIG. 3

INTENT TRACKER - ENGINEER | E.A. INPUT SCREEN | ADDRESS INFORMATION

SATT – Structure Access Intent Tracker

INTENT #: PT03S0003R4    JOB #: R4490X    APPL #: SFO-PS-0001-P-REB    APPL DATE: 4/16/2003

CLEC: COMCAST    GEO/CO: R401    ENGINEER: STILLWELL    POLES ON JOB: 14

SENT TO PGE: 4/22/2004    60 DAYS OUT:    PGE RECEIVED:    REVISION 1:
                                                            REVISION 2:
                                                            INITIALS: 40

INTENT ACCOUNTING LOG

SENT TO PGE: SBC JOB #:    RELATED INTENTS:    RELATED INTENTS, ENGINEER:    HELD IN ACCT #: 4/22/2004
4/22/2004

COURTESY FINAL:    FORM 48:    FINAL BILLED:    ACCOUNT PAID:

UPDATED BY: 40    UPDATED BY: 40

NOTES/COMMENTS:

SAVE/PREVIOUS, SAVE/NEXT, PRINT, SEARCH

RECORD << <  21  > >| >[|] OF 1543

Open
About
Suspend
No Dialog
Exit

FIG. 4

INTENT TRACKER - ENGINEER | E.A. INPUT SCREEN | ADDRESS INFORMATION

SAIT – Structure Access Intent Tracker                                    Monday, March 21, 2005 10:03:05

| INTENT # | POLE # | STREET # | STREET | CRS STREET # | CRS STREET | CITY |
|---|---|---|---|---|---|---|
| PTO3S0003R4 | PTO4813-1 | 1500 | 5TH AV | | | San Francisco |
| PTO3S0003R4 | TP21221 | 450 | MORAGA ST | | | San Francisco |
| PTO3S0003R4 | PTOO5939 | 1697 | 18TH AV | | | San Francisco |
| PTO3S0003R4 | | 1591 | 24TH AV | | | San Francisco |
| PTO3S0003R4 | | 1601 | FUNSTON ST | | | San Francisco |
| PTO3S0003R4 | PG004786 | 1702 | FUNSTON ST | | | San Francisco |
| PTO3S0003R4 | PT3133 | 550 | MORAGA ST | | | San Francisco |
| PTO3S0003R4 | PT2165 | 100 | CARL ST | | | San Francisco |
| PTO3S0003R4 | | 1221 | VICENTE ST | | | San Francisco |
| PTO3S0003R4 | PT1746 | 2401 | 26TH AV | | | San Francisco |
| PTO3S0003R4 | PT3951 | 1524 | VICENTE ST | | | San Francisco |
| PTO3S0003R4 | | 2695 | 21ST AV | | | San Francisco |
| PTO3S0003R4 | PTO6837 | 2100 | 29 TH AV | | | San Francisco |
| PTO3S0003R4 | PT3085 | 1500 | RIVERA | | | San Francisco |
| PTO3S0003R4 | | 2100 | 34 TH AV | | | San Francisco |
| PTO3S0003R4 | | 2250 | ORTEGA ST | | | San Francisco |
| PTO3S0003R4 | | 2845 | NORIEGA ST | | | San Francisco |
| PTO3S0003R4 | | 190 | ELLINGTON ST | | | San Francisco |
| PTO3S0003R4 | PT000812 | 124 | DEL MONTE | | | San Francisco |
| PTO3S0003R4 | | 519 | HURON ST | | | San Francisco |
| PTO3S0003R4 | | 98 | SICKLES ST | | | San Francisco |
| PTO3S0003R4 | | 745 | VELASCO ST | | | San Francisco |
| PTO3S0003R4 | | 198 | BROAD ST | | | San Francisco |
| PTO3S0003R4 | PT2111 | 214 | RAMSELL ST | | | San Francisco |
| PTO3S0003R4 | | 101 | VERNON ST | | | San Francisco |

RECORD << <   21   > >| >|| OF 1543

Open
About
Suspend
No Dialog
Exit

| CITY | # INVENTORIED |
|---|---|
| EL CERRITO | 2020 |
| EL SORANTE | 175 |
| EMERYVILLE | 53 |
| HAYWARD | 1150 |
| LAFAYETTE | 2803 |
| LIVERMORE | 306 |
| MARTINEZ | 881 |
| MORAGA | 586 |
| OAKLAND | 2910 |
| OAKLEY | 71 |
| ORINDA | 2294 |
| PINOLE | 30 |
| PITTSBURG | 51 |
| PLEASANT HILL | 1915 |
| PLEASANTON | 62 |
| RICHMOND | 1540 |
| SAN LEANDRO | 3920 |
| SAN LEANDRO | 513 |
| SAN LORENZO | 37 |
| SAN PABLO | 318 |
| SAN RAMON | 5 |

Open
About
Suspend
No Dialog
Exit

METHOD AND APPARATUS FOR TRACKING AN INTENT

BACKGROUND OF THE INVENTION

1. Field of the Invention

The present invention relates to the field of project management, and more particularly to managing intents within a maintenance project.

2. Description of the Related Art

As projects have become more complex, project maintenance has become a difficult task, particularly for large projects involving multiple parties. In some situations, multiple parties jointly own tens of thousands of pieces of equipment, and must coordinate repairs.

One particularly problematic example of such a complex task is the installation and/or maintenance of telecommunications equipment and power distribution equipment co-located on assets, such as the telephone poles and the like, jointly owned by a telecommunications company and a power distribution company (or another utility company). A similar problem arises when a telecommunications company needs to install and/or maintain telecommunications equipment pole owned by the power distribution company. Other examples of assets may include building structures and manholes. In any of these situations, a first party, e.g. the telecommunications company may issue an "intent," or a formal request, to a second party. For example, a power distribution company, notifying that telecommunications company requires installation and/or maintenance of certain specific equipment. Intents may be described as techniques for communicating work to be performed, such as pole work, between joint owners, e.g. a utility company and a telecommunications company.

Given the very large number (sometimes thousand) of telephone poles that may need to be maintained, or on which equipment needs to be installed, the number of intents can be quite large. The power distribution company may respond promptly to an intent, or a significant period of time may elapse before the power distribution company responds to a particular intent. Accordingly, the telecommunications company faces a daunting task of keeping track of pending intents.

In one aspect, intents are traditionally generated in response to a "project." A project, such as installing or upgrading a telecommunications cable from one city to another, may require generating hundreds of jobs, each job resulting in multiple intents, one intent for each telephone pole associated with the jobs. Traditionally, therefore, the telecommunications company has created a spreadsheet listing all of the intents. The spreadsheet may contain a table, each row of which corresponds to an intent that may correspond to hundreds of telephone poles. The row contains fields that describe the intent pertaining to the telephone poles. Date the intent was generated, when it was accepted by the power distribution company, and when the work on the telephone pole was completed are among the data listed in the row fields.

If a particular project requires modifications to telecommunications equipment mounted on several hundred telephone poles, the spreadsheet corresponding to that project may have several hundred lines, each line being used to keep track of a distinct intent. Each line of the spreadsheet may correspond to a pending intent that that has been communicated from the telecommunications company to the power distribution company.

The large number of intents that may be pending presents a complex tracking and management problem for the telecommunications company. If the power distribution company indicates that work on a particular telephone pole has been acknowledged, the telecommunications company might have to sift through a very large spreadsheet having a large number of intents to find the ones that refer to the particular telephone pole or an asset. Also, the telecommunications company may have issued multiple intents for a particular telephone pole, since the telephone pole may be operative to support many telecommunications cables. Overlooking an intent may require the telecommunications company to re-issue the intent.

A joint pole database has not solved the problem. Although the telecommunications company can access the joint pole database, intents have not been recorded in the joint pole database. Even if intents were included in the spreadsheets, combining all of the spreadsheets into a single computer-readable file would have to be an ongoing process for the computer-readable file to include all of the intents.

Therefore, there is a need for a database solution that allows substantially real time tracking and managing the very large number of intents associated with the field assets that may be jointly owned by different organizations.

SUMMARY OF THE INVENTION

In accordance with an exemplary non-limiting embodiment of the present invention, a method for tracking intents for filed assets is provided. The method may include creating a database structure that includes a number of fields for each intent, providing a program, which when executed on a computer interfaces with the data structure and allows an operator to track intents for a particular asset and to determine a common intent type associated with one or more groups of different assets. The method provides for searching for a selected intent, a selected asset, assets associated with an intent and intents associated with one or more assets. The method also provides in response to the searching, a provision of a report that includes a numerical count of the plurality of records. The method further provides substantially in real time visual reports for the tracking and managing of intents. The method further includes programs that perform one or more statistical analyses on the intent fields.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, reference should be made to the following detailed description of an exemplary embodiment, taken in conjunction with the accompanying drawings, in which like elements have been given like numerals.

FIG. 2 is a schematic representation of a screen shot that may be utilized to input and search intent data by an engineer.

FIG. 3 is a schematic representation of a screen shot that may be utilized by an engineering administrator to input asset or pole related data.

FIG. 4 is a schematic representation of a report that is organized to include a table of intents.

DETAILED DESCRIPTION OF THE INVENTION

In view of the above, the present invention through one or more of its various aspects and/or embodiments is presented to provide one or more advantages, such as those noted below.

Figure 1:
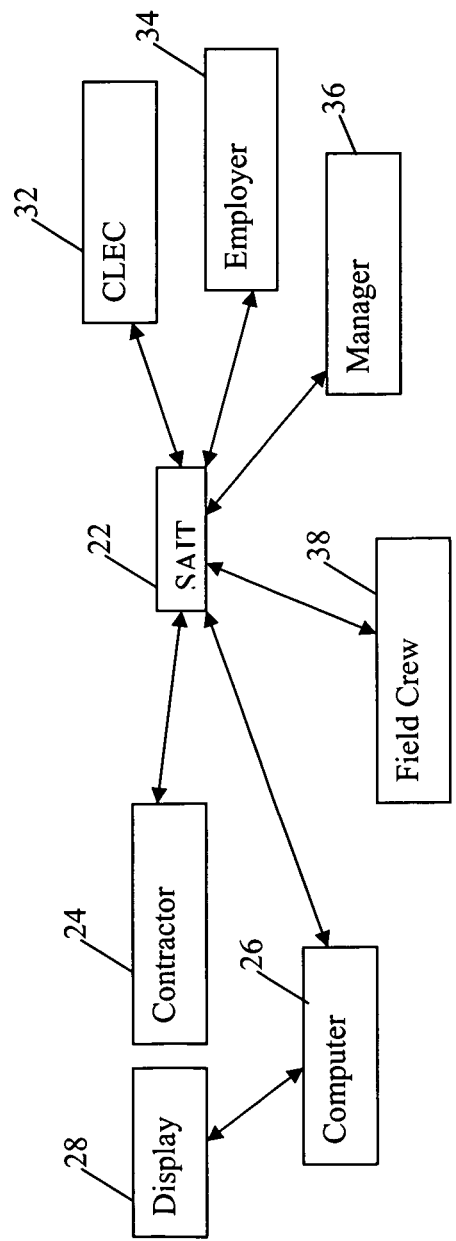
FIG. 1 is a schematic representation of a system, in accordance with one embodiment of the present invention.

FIG. 1 is a schematic representation of a system, in accordance with one embodiment of the present invention.

As shown in FIG. 1, a Structure Access Intent Tracker (SAIT) database, or SAIT (22), is operative to store intents. Each intent may be regarded as a communication from one owner of an asset to another owner of the asset, indicating a desire to perform some work on the asset. Each intent may be part of a job, which may be art of a project described in an application. Each intent may also refer to several assets, which in some implementations may be poles (that is, telephone poles).

In some implementations, an asset may be jointly owned by a telecommunications company, a utility company, and a Competitive Local Exchange Carrier ("CLEC"). One owner may decide to perform work on the asset, but may be required to notify or coordinate the work with the other owners. Each intent may be entered into the SAIT (22) by a contractor (24), a remote computer (26) having a display (28), the CLEC (32), an Employer (34), a Manager (36), and/or a Field Crew (38). Any or all of the contractor (24), the remote computer (26) having the display (28), the CLEC (32), the Employer (34), the Manager (36), and the Field Crew (38) may enter an intent into the SAIT (22).

The display (28) allows a user to view a selected intent for each of the assets or poles associated with the selected intent. The user may see whether each of the intents have been carried out for the asset. The user may select a time period and may see whether each of the intents have been carried out for the affected assets during the time period.

The data may identify a plurality of assets, and a user may input intents related to each of the assets in the plurality of assets, or for a plurality of sources. A program may be executed to enable an operator to view each intent or each group of intents that comply with the selected parameters. Since the data may be searched by source, each owner of the asset may view the intents from each others source.

Each intent may be regarded as a record within the SAIT 22, and may include at least one tracking parameter, also known as an intent parameter. For example, an intent may contain an intent number, a job number, an application number, a GeoCo number, a number of JT poles on an application, a number of poles on an intent, a type of intent, an indication whether the intent is an owner-to-owner pole replacement, an indication whether the replacement (if the intent is a replacement) was caused by a competitive local exchange carrier ("CLEC"), an author's initials (or name, or ID number), an intent work start date, an intent finish date, an intent sent to PG date, an indication whether an intent has remained open for at least sixty (60) days, an "18.1D", indication, and a confirmation indication.

A CLEC may be, for example, a telephone company that provides telephone services but does not own its own transmission lines between two desired sites owned by another party. When a CLEC sells a telephone line, such as a dedicated line between two such sites, the CLEC installs the telecommunications line to provide a physical connection between the two sites. The "physical connection" may be a cable, collection of cables, wireless connection such as a radio-frequency or microwave connection, laser or other optical connection, or any device or collection of devices that can provide information from one location to another.

The CLEC may approach the telecommunications company with an application known as a "Make Ready." The Make Ready identifies to an engineer the specific work functions for every pole that the CLEC wishes to access. Work functions may be such as, but not limited to, placing a cable on a pole, placing an anchor to secure a pole, placing boxes or purchasing a particular grade of space on a pole. One grade usually means one foot of pole space. The Make Ready that is received from a CLEC company may be reviewed by a telecommunication company person, such as an Engineer or a Project Manager ("PM").

In response to the Make Ready, the PM or Engineer may determine that work such as inspection, maintenance, repair, upgrade, or other modification may be necessary. Many telephone poles in the United States support both power lines and telephone lines, and are jointly owned by a utility company and a telecommunications company, and therefore the telecommunication company may have to notify the utility company (or other "Joint Owner" of the telephone poles) that work on a telephone pole, or on a collection of telephone poles, is contemplated. Accordingly, the Engineer may analyze the Make Ready to ensure that any item on the Make Ready that requires the Engineer to notify the Joint Owner (e.g., the utility company) is included in the intent.

The Engineer may examine the Make Ready, determine how many intents are required, the total number of poles for the job, the types of intents required and their type. The Engineer may enter the number of poles for the individual intent, the type of intent and the start date may be provided to a Structure Access Intent Tracker ("SAIT") database, or simply the SAIT, which is described in greater detail below. The Engineer may then communicate a processing fee amount to an Engineering Administrator ("EA").

An intent may originate in response to a Make Ready from a CLEC or other customer, but may also originate in response to events. For example, work may also be necessitated by destructive weather incidents, traffic accidents, vandalism, or legal regulations. If a telephone pole is damaged in a storm or is struck by lightning, then work may be necessary to repair the telephone pole. If a motorist damages a telephone pole by colliding a motor vehicle with the telephone pole, then work may be necessary to restore the telephone pole to operability.

The intent may also originate in response to a determination by the telecommunications company to upgrade its cables. As telecommunications technology has evolved, and needs for telecommunications services has grown, the telecommunication company may determine that a cable may have inadequate capacity. Accordingly, an intent may be generated corresponding to a need to upgrade cables on a set of telephone poles. Intents may also be generated by any of the Joint Owners. For example, the utility company may need to perform work on a telephone pole in response to a power surge or other source of damage to a power line.

Regardless of how the intent is originated, the intent may then be communicated to the owner or a Joint Owner (or Joint Owners) of each telephone pole along the physical connection to facilitate coordination of repair, maintenance, and modification of each telephone pole. The intents may be sent via email, or may be placed on a web page internal to one or more of the Joint Owners or may be posed to a third party that may facilitate communication among the Joint Owners. The intents may also or alternatively be transmitted as a paper file among the Joint Owners.

Advantageously, the intents may be placed in the SAIT, which may include a database and/or other file management system or systems. The SAIT may be required to handle thousands of intents with more than 58 fields of related data and potentially thousands of associated pole addresses. If an intent is required, a job and an intent number may be created in response to the intent, and the intent may be input into SAIT by the Project Manager.

The SAIT may be, for example, an interactive database that allows users to store, retrieve, update, manage and analyze intents on a regional level for work performed on telephone company's telephone poles by CLEC companies. The SAIT may be used by telecommunications companies, such as SBC North Bay Engineering, Central Valley Engineering, North Engineering and South Bay. The SAIT may be implemented as an Access database, a sequential query language (SQL) database, an Oracle database, or other database technologies.

Intents can also be used to keep track of costs associated with the intents. The process from getting the intent from the open status to closed may be tracked in order to maintain efficiency so that the telecommunications company can recover the costs or pay the Joint Owner. Any intent that is sent to the Joint Owner to process may have a processing fee associated with it and an advance payment ("AP") which is the estimated cost factor of the work function(s). These payments may be in place prior to beginning the work function. The SAIT can provide an exceptional way of managing the numerous intents with all of their variations, issues, statuses and AP processing capabilities.

Intents may be described thoroughly within the SAIT. The type of intent may be abbreviated as follows: "R" may represent a pole replacement; "A" may represent any anchor work to be performed by another party; "P: may represent a purch grade, or solely owned anchor work; and "I" may represent information only. The various types of intents may include Information Only, Purchase of Grade/100% Anchor, Other Anchor (Joint owned), Pole Replacement 7.3 and Pole Replacement 7.11. An Information Only intent may be used to simply inform a joint owner about an asset, e.g. when the weight of equipment installed on a pole does not affect the overall load bearing capacity of the pole, and an engineer is requested to visit the pole and obtain information for the SAIT. A "Purchase of Grade/100% Anchor" intent may be used when additional space on a pole is requested to provide capability for a CLEC or when terrain subsidence has necessitated re-anchoring of the pole. An "Other Anchor" (Joint owned) intent may be used in circumstances similar to a Purchase of Grade/100% anchor, but when the intent has been received from a Joint Owner. A "Pole Replacement 7.3" intent may be used when a pole has been slightly damaged but equipment (e.g. transformers) on the pole has not been damaged; only the pole need be replaced, and the equipment may be transferred to a new pole. A Pole Replacement 7.11 intent may be used when a joint owner puts on to much weight on a pole and must pay for the installation of a new pole. Each Intent type may have its own set of requirements.

The SAIT may include a record for each intent, and information pertaining to each intent may be stored in fields of the record. However, some fields may not be pertinent to all records. For example, an Information Only intent may not require certain information that a Pole Replacement would.

Various methods and queries may be executed on the SAIT; for example, a user may query the database for all intents that can be processed quickly. The query may be structured such that a report generated in response thereto would include all Information Only intents without including any Pole Replacement intents, since an Information Only intent may be processed quickly. The Pole Replacement intent type would not be lost while identifying all those that can move through the system in a shorter interval.

The SAIT may also be accessed by an Engineer. If an intent were entered by a Project Manager, then an Engineer looking for work may be able to use the SAIT to pull a next available intent to be worked and continue on in the process. If an intent were entered by an Engineer, then the Engineer may include a signature on the intent in the SAIT and continue on in the process.

The SAIT may also be accessed by an Engineering Administrator. If a Project Manager estimates a cost of a project, or identifies a processing fee that has been entered by an Engineer, the Project Manager may use the SAIT to provide the cost to the Engineering Administrator ("EA"). If the EA requests an advance payment ("AP") from the CLEC (if the intent is in response to a Make Ready from the CLEC) or Joint Owner (if the intent is generated by a Joint Owner), the EA may input the date and amount of the request into the SAIT database. Once a check is returned in response to the AP, the check number and date may be input into the SAIT.

Once the check number and date have been input into the SAIT, the Engineer may be notified of the check and may start work on the intent. When the intent preparation is completed, the Engineer may input the completion date into the SAIT. In response to the completion of the intent preparation, the Engineering Administrator may then issue the intent. The Engineering Administrator may make copies, and may package and issue the intent to the utility company (i.e., the Joint Owner). The issue/sent date is put into the SAIT. If the telecommunications company is willing to perform the work before receiving payment, or if payment has already been received (e.g., in response to an AP), then a "clock" may start running on that intent.

Since an intent may require coordination of work among several Joint Owners, the Engineer may decide to delay work until after a response has been received from the Joint Owner. If the intent has been responded to, the Engineer may enter the response date into the SAIT to confirm that the telecommunications company has received a response.

If a first predetermined period of time such as 60 days has elapsed since the sending of the intent and still the Joint Owner has not responded to the intent, a report may be pulled by the Supervising Manager ("SM") from the SAIT. Any intent included on the report may indicate that the Joint Owner has not responded to the intent. A courtesy notice may then be sent to the Joint Owner stating that if there is no response in a second predetermined period of time, such as 45 more days, the intent will begin the closing process. The SAIT may then be used to track the intent up to that 45 day period.

If the Joint Owner does not respond to the courtesy notice within 45 days, or within whatever other predetermined time period following the courtesy notice the telecommunications company has established, the intent may be closed in accordance with a closing process. The telecommunications company may annotate the date closing was initiated in the SAIT database.

If the Joint Owner does respond to the courtesy notice within the 45 days, or within whatever other predetermined time period following the courtesy notice the telecommunications company has established, then the intent may follow its normal course through the system. The normal course may include, for example, generating a final bill or generating a debit order to a prepaid account (which may be known informally as a Form 56), and entering a final billing date, a Form 56 date, and an accounts payable representative's initials into the SAIT. If a prepaid account is insufficient, then both a final bill and a debit order may be generated, and a final billing date and a Form 56 date may be entered into the SAIT.

If the Engineering Administrator ("EA") enters or confirms that payment (or adequate assurances) has been received and/or that the prepaid account has been debited, the EA may enter a date and the EA's initials into the SAIT. The SAIT may have been updated to associate the intent number with a pole number (or collection of pole numbers). A relational database may include a pole address (including a street number, a street name, a cross street number, a cross street name, and city in which the pole is located) corresponding to each pole number. The relational database may also include more detailed pole data, such as but not limited to, heights of attachment, percentage owned, etc. The SAIT may also be integrated into other software, such as communications software, such that the SAIT may be used to communicate electronically with a Joint Owner through the SAIT database. The SAIT may also be integrated with other databases, such as procurement software, accounting software, website management software, and customer relations management ("CRM") software used by representative who interact with the CLECs.

Accordingly, several people may access the SAIT. Engineers may access the SAIT to review their work load, look for more work, research issues that arise, look for outstanding items, and more. The Project Manager may use the SAIT to track the intent process as a whole, look for trends, look for holes in processes, input job numbers that possibly need an intent and more. The Engineering Manager may use the SAIT to look at the Engineers productivity and look and analyze the overall progress and scope of the workload. The Supervisor Manager may use the SAIT to manage the Engineering Administrators workloads, pull reports and check productivity of their employees.

Accordingly, a method for tracking may respond to an intent parameter. The intent parameter may be, for example, a search term, an intent identifier, an application number, a job number, an engineer name, an engineer number, date range, a CLEC identifier, and/or a city. Multiple intent parameters may be included, using Boolean searching or any known database query languages, such as SQL (sequential query language).

In response to the intent parameter, a SAIT database is searched, to provide at least one record pertaining to the intent parameter. Each record may identify an intent. Any of several types of reports may be produced, including an engineer report and an engineer administrator report. Specifically, in response to the searching, a report is provided. The report may include, for example, a numerical count of the plurality of records. The numerical count may be a number of poles, a number of intents, a date list, a statistical analysis of the records returned by the search, and/or other information that may be obtained from the database.

One aspect of the report is that it may provide statistical analysis of the data. For example, the report may include a graph showing a number of pending intents on a vertical axis and a number of days of pendency on a horizontal axis. The report may be organized by city, by engineer, by date range, by project, or in other ways to allow an engineer administrator to notice and measure possible causes of delays in completion of projects.

The report may be organized into a format appropriate for an engineer (an "engineer report"), or may be organized into a format appropriate for an engineer administrator (an "engineer administrator" report). FIG. 2 is a schematic representation of a screen shot showing a report that is organized into an engineer report. If the report is an engineer report, then the report may further include (for each record identifying an intent) an intent identifier, a job identifier, an application identifier, an application date, a CLEC identifier, a GEO/CO (geographic area) identifier, an engineer identifier including at least one of an engineer name and an engineer number, a joint poles on job count, a poles on intent count, an intent type indicator, a start date indicator, an end date indicator, and at least one PM number indicators. The report may also include a joint owner sent date indicator, which indicates when an intent was communicated to the joint owner (or joint owners). The report may also include an age-of-intent indicator, which indicates either a number of days of pendency since the intent was sent to the joint owner(s), or a number of intents that have been pending for at least a pre-determined number of days. The age-of-intent indicator may generally indicate how long an intent has been pending; a series of day ranges is established (e.g., 0-30 days, 31-60 days, etc.), and the age-of-intent indicator may be used to indicate which day range includes the number of days the intent has been pending.

The report may also include a joint owner received date indicator, a changed sums status indicator, a notes field, a count of total intents, a list of associated intents (including an intent 2 indicator, an intent 3 indicator, and an intent 4 indicator), an owner to owner field, an intent to core field, a Spoc Initiated field, a Can Be 18/1 db indicator, a courtesy final/form 56 indicator, a form 56 indicator, an intent final billed date field, an NCIPA closed date field, and an intent cancelled field. Although not shown on FIG. 2, the report may also include an expected response date identifying when a response is expected, a revision list, a closing process flag operative to identify whether the intent is in a closing process, and a pole address including a pole number, a street number, a street name, a cross street field, and a city field. The report may be provided such that only the note field being modifiable by an engineer, all fields of the plurality of fields being modifiable by an engineer administrator.

FIG. 3 is a schematic representation of a screen shot showing a report that is organized into an engineer administrator report. If the report is an engineer administrator report, then the report further includes (for each record identifying an intent): an intent identifier, a job identifier, an application identifier, an application date, a CLEC identifier, a GEO/CO identifier, a first engineer identifier including at least one of a first engineer name and a first engineer number, a joint poles on job count, a joint owner sent date indicator, an age-of-intent indicator, a joint owner received date indicator, a revision list, an intent status indicator, a joint owner job number, a first list of associated intents, a second list of associated intents, a second engineer identifier including at least one of a second engineer name and a second engineer number; courtesy final/form 56 indicator, a form 56 indicator, an intent final billed date field, a held-in-account number identifier, an account paid date identifier, a first updated by indicator, a second updated by indicator, and a notes/comments field.

FIG. 4 is a schematic representation of a report that is organized to include a table of intents. Within the table of intents, each row may correspond to an intent and each column (that is, each field within the row) may correspond to a characteristic of the intent. The characteristic of the intent may be, for example, an intent identifier, a pole identifier, a street number, a street name, a cross street address number identifier, a cross street address street name identifier, and/or a city identifier. Many characteristics may be combined, and more than one may be provided.

Historical data may also be included. For example, the report may include a list of all repairs made to a particular telephone pole since it was erected, or a list of all repairs made during a particular range of dates. The report may include a list of all repairs made by a particular engineer, or a list of all repairs made on a particular street or in response to a particular project or group pf projects.

Statistical information may also be included in the table of intents. For example, the statistical information may include correlations between engineers and projects, or between cities and number of intents. A correlation between a city and a number of intents may be useful in anticipating whether the city may need more resources in the future. The report may also be organized to show a list of telephone poles for which more than one intent are pending; if multiple projects require maintenance of a particular telephone pole, then the telecommunications company may be able to schedule only a single visit to the telephone pole to perform all of the maintenance pertaining to all of the multiple projects.

Figure 5:
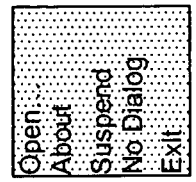
FIG. 5 is a schematic representation of a report organized to include a table in which each row of the table corresponds to a city and in which each column (that is, each field within each row) corresponds to either a city name or a number inventoried assets or poles.

FIG. 5 is a schematic representation of a report organized to include a table in which each row of the table corresponds to a city, and in which each column (that is, each field within each row) corresponds to either a city name or a number inventoried identifier (or both). Accordingly, the report may reveal which cities have a greater number of inventoried telephone poles.

Figure 6:
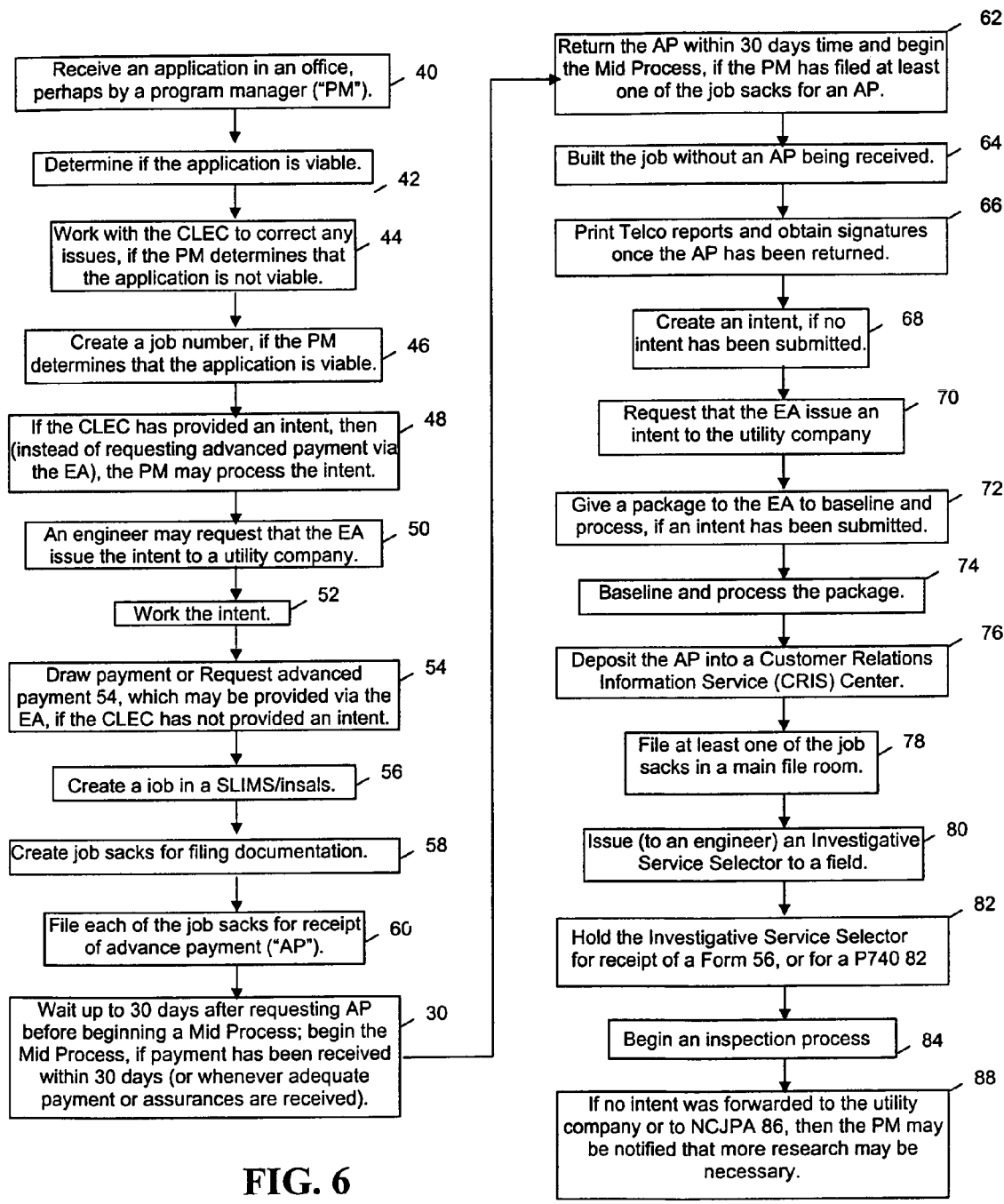
FIG. 6 is a data flow diagram of a structure access intent tracker, i.e. an aerial process flowchart.

FIG. 6 is a data flow diagram of a structure access, i.e. an aerial process flowchart. Initially, an application may be received 40 in an office, perhaps by a program manager ("PM"). The application may be obtained, for example, from a CLEC. The PM may determine if the application is viable (42). If the PM determines that the application is not viable, then the PM may work with the CLEC to correct any issues (44). If the PM determines that the application is viable, then the PM may create a job number (46). The job number may be in Telco11i.

If the CLEC has provided an intent, then (instead of requesting advanced payment via the EA), the PM may process the intent (48). An engineer may request that the EA issue the intent to a utility company (50). The utility company and the telecommunications company may then work the intent (52). An account may be used to draw payment (54). The CLEC may provide a check to both the telecommunications company and the utility company. Utility companies such as AP&T and PG&E may require a check from CLECs such as Seren RCN and others.

If the CLEC has not provided an intent, then the PM may request advanced payment 54, which may be provided via the EA. The PM may request that the EA create a job in a SLIMS/insals (56), and the EA may create job sacks for filing documentation (58). The PM may then file each of the job sacks for receipt of advance payment ("AP") (60). The PM may wait up to (30) days after requesting AP before beginning a Mid Process. If payment has been received within (30) days (or whenever adequate payment or assurances are received), the PM may begin the Mid Process. If the PM has filed at least one of the job sacks for an AP, then the AP may be returned within (30) days time (62) and the PM may begin the Mid Process. It should be noted that some older jobs were built without an AP being received (64). Once the AP has been returned, the PM may print Telco reports, and may obtain signatures (66).

If no intent has been submitted, then the engineer may create an intent 68. The engineer may then request that the EA issue an intent to the utility company 70. The intent may then be worked by the utility company, and/or by the telecommunications company.

If an intent has been submitted, then engineer may give a package to the EA to baseline and process (72). The EA may then baseline and process the package (74), and the EA may also deposit the AP into a Customer Relations Information Service (CRIS) Center 76. The EA may also file at least one of the job sacks in a main file room (78). If a job is required, then the engineer may be issued an Investigative Service Selector to a field (0.) The Investigative Service Selector may be held for receipt of a Form (56), or for a P740 (82).

As shown at 84, an inspection process may be begun 84. If no intent was forwarded to the utility company or to NCJPA (86), then the PM may be notified that more research may be necessary (88). If an intent was forwarded to the utility company or to NCJPA, then the PM may determine whether Form (56) has been obtained from either the utility company or the const P740 (90). If no Form (56) has been obtained from either the utility company or the const P740, then the PM may research a Form (56) or const P740 status (92). If a Form (56) has been obtained from either the utility company or the const P740, the PM may determine whether either the telecommunications company or the utility company has completed any physical work items (94).

If physical work items have been completed by either the telecommunications company or the utility company (96) e.g., if an anchor or pole has been placed, removed, or rearranged, then the telecommunications company may begin a Closing Process. If no physical work items have been completed by either the telecommunications company or the utility company, then a job may be held for a re-inspection (98).

In the Closing Process, the re-inspection may be used to verify that a job closure check list shows that the AP was received (100). The re-inspection may then be verified and an inspection notice may be generated to show that the job has passed the re-inspection (102). A closing process may then be executed (104). If the job closure checklist does not show that the AP was received, then a copy of the re-inspection may be returned to the PM for research (106); moreover, the job may be delayed indefinitely until the job closure check list shows that the AP was received, or a determination may allow the job to proceed, and a final bill to be sent during the closing process.

Although the invention has been described with reference to several exemplary aspects of an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with the exemplary aspects of the exemplary embodiment of the present invention, the methods described herein may be intended for operation as a software program (or software programs) running on at least one computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementation of the present invention as described herein is optionally stored on a tangible storage medium, such as: a magnetic medium such as a disk or tape; a magneto-optical or optical medium such as a disk; or a solid state medium such as a memory card or other package that houses one ormore read-only (non-volatile) memories, random access memories, or other re-writable (volatile) memories. Accordingly, the invention is considered to include a tangible storage medium, as listed herein and including art-recognized equivalents, in which the software implementation herein is stored.

Although the present specification describes components and functions implemented in the exemplary aspects of the exemplary embodiment with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A method of managing jointly owned assets, comprising:
    enabling a first owner of a jointly owned asset to communicate an intent to a second owner of the jointly owned asset, the intent indicating a desire to perform work on the jointly owned asset;
    enabling the first owner to store the intent in an intent database that includes a plurality of intents, wherein the intent database includes a set of data fields for each of the plurality of intents;
    responsive to a request for a first type of report, generating, at a computer, a first report identifying, from the plurality of intents, intents indicating a desire to perform work on a selected asset; and
    responsive to a request for a first type of report, generating a second report identifying assets that share a common value for an intent parameter represented by one of the set of data fields.

2. The method of claim 1, wherein:
    the set of data fields includes a field selected from a joint-owner-sent-date field and a joint-owner-received-date field.

3. The method of claim 2, wherein:
    the set of data fields includes a field selected from a competitive local exchange carrier field, a joint-poles-on-job count field, a poles-on-intent count field, and a pole address field.

4. The method of managing intents of claim 3, wherein:
    the set of data fields includes an accounting field selected from a changed sums status field, an intent final billed date field, and an expected response date field identifying when a response is expected.

5. The method of managing intents of claim 3, wherein:
    the first asset owner is a first telecommunications company and wherein the intent database indicates work performed on poles of the first telecommunications company by a competing telecommunications company.

6. A tangible computer readable medium comprising program instructions, embedded in the computer readable medium, for tracking structure access intents, the program instructions comprising instructions for:
    communicating a structure access intent from a first owner of a jointly owned asset to a second owner of the jointly owned asset, wherein the structure access intent indicates a desire to perform work on the jointly owned asset;
    storing the structure access intent in an intent database, wherein the database includes a plurality of structure asset intents;
    searching the intent database for structure access intents matching specified criteria for an intent parameter; and
    generating a report indicating structure access intents matching the specified criteria, intent identifiers corresponding to each of the structure access intents, intent type identifiers corresponding to each of the structure access intents, and a number of poles associated with each of the structure access intents.

7. The computer readable medium of claim 6, wherein the structure access intents matching the specified criteria include a first structure access intent associated with a job associated with multiple structure access intents including the first structure access intent, and wherein the report indicates a job identifier and a number of poles associated with the job.

8. The computer readable medium of claim 6, wherein the report indicates at least one intent parameter selected from an age, a start date, and an end date for each of the structure access intents.

9. The computer readable medium of claim 6, wherein the report identifies a geographic area associated with each of the structure access intents.

10. The computer readable medium of claim 6, wherein:
    the intent type identifiers identify an intent type selected from a pole replacement intent, an information only intent, a 100% anchor intent requesting additional space on a pole by a competitive local exchange carrier, a first pole replacement intent suitable when equipment on the pole has not been damaged, and a second pole replacement intent suitable when a joint owner puts too much weight on the pole.

11. A method of managing jointly owned assets, the method comprising:
    enabling each owner of a jointly owned asset to communicate an intent to all other owners of the jointly owned asset, the intent indicating work intended to be performed on a group of the jointly owned assets;
    enabling each owner to access an intent database that includes a record for each of a plurality of intents, each record including a plurality of fields;
    enabling each owner to access an interface for entering additional intents into the intent database;
    enabling each owner to specify intent criteria; and
    generating, by a computer, a report based on records satisfying the intent criteria.

12. The method of claim 11, wherein a first joint owner is a telecommunications company and a second joint owner includes an entity selected from a competitive local exchange carrier and an electric power provider.

13. The method of claim 11, wherein the plurality of fields includes a source field indicative of a source of the intent and wherein the intent criteria include source field criteria.

14. The method of claim 11, wherein the report includes a table having a plurality of entries and the intent criteria specify a set of intents and wherein each entry in the table corresponds to one of the set of intents.

15. The method of claim 14, wherein each entry in the table corresponds to an asset associated with at least one of the set of intents.

16. The method of claim 15, wherein the asset comprises a telephone pole.

17. The method of claim 15, wherein each entry in the table includes an indication of a geographic location of the asset.

18. The method of claim 14, where each entry in the table is associated with a corresponding geographic region.

19. The method of claim 18, wherein each entry in the table indicates a number of inventoried assets in the corresponding geographic region.

20. An asset management method, comprising:
- generating an intent, wherein the intent is associated with a plurality of jointly owned assets owned, at least in part, by a company and wherein the intent indicates work to be performed by the company on the plurality of jointly owned assets;
- communicating the intent to a joint owner of the plurality of jointly owned assets;
- storing the intent in an intent database having a plurality of intents;
- requesting a computer to generate a requested report selected from:
    - a first report identifying, from the plurality of intents, a set of intents associated with a selected asset; and
    - a second report identifying a set of assets associated with a selected intent.

\* \* \* \* \*